Oct. 18, 1949.  V. J. EVANS  2,485,145
COMBINATION BURNER AND GRATE
Filed April 9, 1945
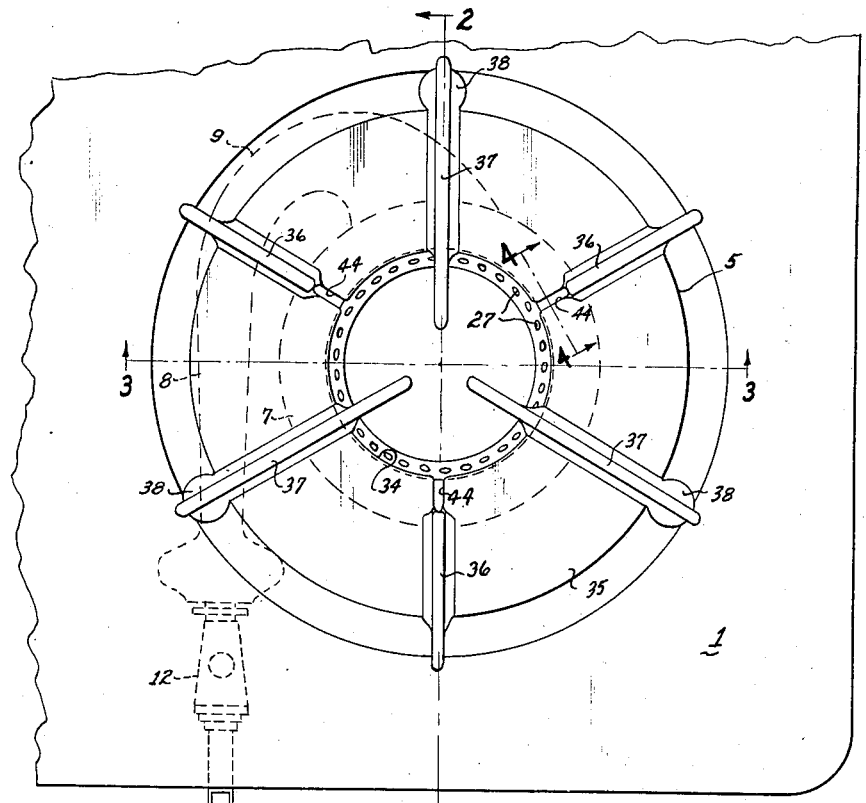
Fig. 1
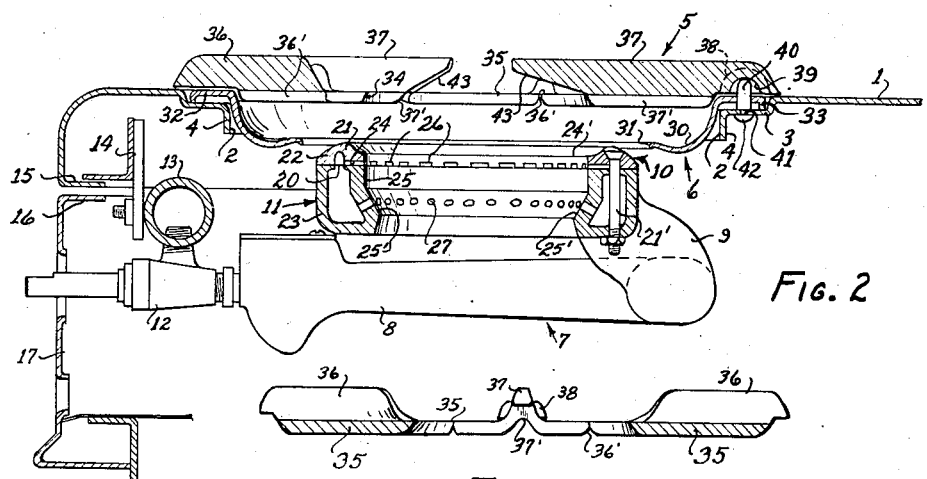
Fig. 2
Fig. 3
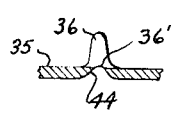
Fig. 4
INVENTOR.
VINCENT J. EVANS
BY John H. Leonard
ATTORNEY Patented Oct. 18, 1949

2,485,145

UNITED STATES PATENT OFFICE 2,485,145

COMBINATION BURNER AND GRATE

Vincent J. Evans, Lakewood, Ohio, assignor to Grand Industries, Inc., a corporation of Ohio Application April 9, 1945, Serial No. 587,341

5 Claims. (Cl. 126—214)

1

This invention relates to a combined gas burner and grate for cooking ranges and the chief object is to provide an improvement in the type of apparatus indicated, particularly to increase burner efficiency and safety.

Most burners for gas cooking ranges are provided with open grate arrangements usually with radially extending grate or grill bars and annular connecting ribs or rings cast integrally with the grate bars. The grate is positioned directly above the burner and the burner flame is either directed upwardly or upwardly and toward the center of the burner. Inefficient use of the heat of the products of combustion with the commonly used arrangements arises largely from the fact that the heat of the flame as a whole is not concentrated at the center of the burner and because no special means are provided to prevent heat loss downwardly. The ordinary grate does not tend to retain or blanket the heat of the flame. Moreover, the open grate formation allows food spillage to reach points below the level of the range top where the spilled materials are difficult to remove. A further disadvantage of cooking range constructions generally used is that the grate and burner assembly is adapted to serve either for heating large or small cooking vessels but is not adapted to serve equally well for both.

In view of the above a further object hereof is to eliminate the above discussed disadvantages and to provide a burner and grate construction operable to concentrate as much of the heat of the products of combustion as possible centrally of the burner while allowing for free passage of such products radially beneath the utensil and while minimizing burner heat losses in a downward direction.

Another object is to provide an improved burner head and fuel porting arrangement therefor.

Still another object is to provide an improved means for supporting and centering a grate over a range burner.

A still further object is to provide a grate having the advantages mentioned above without necessitating greatly increased cost and without increasing manufacturing difficulties.

Further objects of the present invention include provision of a spillage guard on the grate and means for blanketing heat by and below the grate structure in heating relationship to a cooking utensil or other object to be heated while supported on the grate.

Other objects and advantages will become apparent from the following description of the preferred form shown in the drawing. The essential

2 characteristics are summarized in the claims. In the drawings:

Fig. 1 is a fragmentary plan view of a portion of a cooking range associated with one of the burners;

Fig. 2 is a vertical sectional view taken along the line 2—2 on Fig. 1;

Fig. 3 is a similar sectional view of the grate alone, taken along the line 3—3 on Fig. 1, and Fig. 4 is a detail sectional view of the grate taken at 4—4 on Fig. 1.

In the portion of the cooking range shown 1 is the usual top panel of the range having as many burner openings 2 as there are burners. The opening 2 is formed by an annular depressed portion 3 of the top panel terminating inwardly in a substantially vertical flange 4 the inner surface of which defines the opening 2. The portion 3 forms a seat for a circular burner bowl 6 of substantially conventional form which, as shown, rests directly upon and is centered by the depressed portion 3 of the top panel. The burner bowl thus supports the grate or grate unit 5 with which the invention is largely concerned. The grate unit as shown is a single casting although it may be made otherwise.

The burner 7 has the usual support in the form of a mixing tube 8 terminating at one side in a gooseneck portion 9 which extends upwardly from the main portion of the tube to support the burner head 10. The lower annular portion 11 of the burner head is made integral with the portion 9 of the tube 8. A supply valve or cock 12 enters the mixing tube at one end and is connected with the usual gas manifold 13 carried by a bracket assembly 14. The bracket assembly may be supported, through fasteners (not shown), by flange portions 15 and 16, respectively, of the top panel 1 and front apron 17 of the range.

The burner head portion 11 is, in effect, a hollow ring which, as formed as by casting, is open at the top at 20. The open top is closed by an annular burner cap piece 21 of inverted U-shaped cross section having an outer wall 22 in face to face contact with the upper face of the outer wall 23 of the head portion 11 and an inner wall portion 24 maintained in interrupted contact with the upper edge of the inner wall 25 of the burner head portion 11 to provide burner ports 26. Bolts 21', one shown, hold the cap piece 21 in fixed position on the head. The cap 21 and walls 23 and 25 of the burner head form a manifold or hollow space for gas supplied through the extension 9 of the mixer tube. The upper surface 24' of the cap forms a reflector tending to concentrate heat centrally of the burner and grate assembly.

Th annular space inside the burner head may be ported toward the center of the burner head only by the series of notches forming the ports 26. Additionally, however, a series of ports 27 may be cast or drilled into the inner peripheral wall 25 of the head whose exposed surface is frusto-conical as at 25' for a considerable portion of the vertical extent of said wall, partly to reflect heat upwardly and toward the center of the burner. The ports 27 are normal to the converging surface 25' so that the axes of the holes are inclined upwardly and radially toward the burner center. The axes of the ports 26 are directed radially inwardly, either in a horizontal plane or in upward or conical formation as determined in part by the top or rim surface of the wall 25 of the head which may be either planar (as shown) or somewhat frusto-conical.

The burner bowl 6 has a central trough portion 30 provided by a depressed generally bowl-shaped flange which terminates inwardly to form an opening 31 concentric with the burner head and spaced therefrom sufficiently to enable passage of secondary air upwardly around the burner head to supplement the secondary air supplied through the open center of the head. The burner bowl 6 has an outer annular web or plate portion 32 which is flanged downwardly at 33 at its outer perimeter to enable the bowl to nest into the depressed portion 3 of the top panel. Alternatively, the web or plate portion of the burner bowl may rest directly upon the depressed portion 3. The purpose of the flange 33 for supporting the burner bowl is in order to present the top face of the portion 32 flush with the range top panel, thus enabling an ordinary burner grate (with no bowl), which may be used interchangeably with the grate unit 5, to rest in the depression 3 without being supported too high above the range top.

Referring further to the grate 5 this comprises an annular web or plate portion 35, all substantially in one plane and of considerable extent inwardly from the inner limits of the top or plate portion 32 of the burner bowl 6. The size of the opening 34 in the plate 35 is determined in part by the size of the burner head, the preferred proportions being such that the burner head is nearly or wholly concealed from a point of view directly above the burner. The web or plate 35 supports a radiating arrangement of grate bars which are in two sets, three short grate bars 36 of one set being disposed between longer grate bars 37 constituting the other set of three bars. The grate bars terminate outwardly at about the same distance from the burner center, and the bars of one set, the longer ones 37 as shown, have at their outer ends, in bosses 38, downwardly facing sockets 39 which match in position and fit loosely over grate supporting and aligning pins 40 carried on the top panel 1. Preferably the pins extend upwardly through small openings in the portion 32 of the burner bowl 6 to dowel the burner bowl in place. The pins may be riveted to the top panel 1 at suitable openings 41 in the depressed panel portion 3 downwardly beyond which the heads 42 of the rivets underhang the portion 3 around the openings 41. Only one locating pin 40 is illustrated, the others being identical therewith.

The shorter grate bars 36 are arranged with their inner ends a considerable distance outwardly from the burner center to minimize obstruction to passage of products of combustion from the burner horizontally beneath the bottom of the object or utensil to be heated. The grate bars 37 on the other hand are extended inwardly a considerable distance beyond the inner limits of the opening 34 in the plate portion, and in order to avoid contact with the flame, the lower surfaces of the projecting portions of the longer grate bars 37 are directed upwardly as indicated by the bevel surfaces at 43 overhanging the central open space provided by the burner head.

In order to minimize or prevent warping of the web or plate 35 when made integrally with the shorter grate bars by casting it has been found advisable to form slots 44 in the web, said slots being radially aligned with the shorter grate bars 36 and open at their inner ends toward the burner center. Further, to prevent or minimize warping of the plate out of shape by cooling strains, the plate 35 has grooves 36' and 37' (see Fig. 2) beneath the respective bars 36 and 37 radially coextensive with the plate.

In the operation of the burner and grate combination described above, it will be seen that the gas flames from the sets of burner ports 26 and 27 (or from one set if only one is provided) merge at the burner center and are forced by convection currents admitted by the central opening of the burner head to rise upwardly approximately to the level of the burner bowl portion 30 in the region of the projecting ends of the longer grate bars. The flame is normally maintained out of contact with the longer grate bars by reason of the upwardly directed lower surfaces 43 of said bars. When a small vessel is used the heat is concentrated at the burner center below such small vessel and the latter is stably supported by the three longer grate bars 37. The web or plate 35 of the grate unit forms a guard against spillage of liquid into the burner ports and particularly those at 26 which are the main ports and the only ones necessarily used. Because the flame is concentrated at the center of the grate and the margins around the point of concentration of the flame are guarded by the web or plate 35, there is little danger of the clothing (e. g. sleeves) of the operator catching fire by contact with the burner flame.

In case of using a larger utensil such as a cooking vessel, that is, one which extends outwardly a considerable distance beyond the central opening of the web or plate 35 over the grate bars 36, the web or plate portion 35 of the grate unit and particularly that part of the plate which overhangs the burner bowl 6 absorbs and retains a considerable portion of the heat from the burner for radiation against the utensil.

It will also be seen, particularly from comparison of Figs. 1, 2 and 3, that between the walls of the annular burner head, the burner bowl 6 and the plate portion 35 of the grate unit, which is substantially imperforate except for the central burner opening, a heat reservoir is formed from which nearly all of the heat of the products of combustion emitted from the burner must pass upwardly toward an object or utensil to be heated supported on the grate bars, e. g. centrally of the grate. The metal of the annular plate portion 35 of the grate has sufficient body to form a heat absorbing and retaining blanket which is subjected directly to heat emitted by the flame from the burner or reflected by the utensil or burner bowl and thus absorbed by the plate. Heat reflected downwardly and outwardly by the utensil is, in turn, reflected upwardly by the burner surfaces 24' and/or 25' and the burner bowl. The reflecting surfaces cooperate with the upwardly moving annular column of air between the burner and burner bowl 6 and the upwardly moving convection currents centrally of the burner head, so that substantially none of the heat emitted by the burner flame is lost. Downward heat loss centrally of the burner is minimized or prevented both by reflection afforded by the frusto-conical wall portions 24' and 25' and by convection currents which in order to supply the flame at the center of the burner necessarily move upwardly.

I claim:

1. In and for a cooking range having a top panel with a burner opening, a grate unit adapted to be supported by the top panel and to project inwardly of the burner opening, said grate unit comprising an annular plate for generally closing outer portions of the panel opening, and two sets of radial grate bars on the plate, one set terminating inwardly from the outer limits of the plate opening and the other set terminating at points outwardly beyond said limits of the plate opening, and said plate having grooves aligned with the grate bars on the side opposite from the grate bars.

2. In and for a cooking range having a top panel with a burner opening, a grate unit adapted to be supported by the top panel, said grate unit comprising an annular plate arranged to close part of the panel opening, and a plurality of radially extending grate bars on the plate, some of the grate bars extending inwardly beyond the limits of the opening in the plate, and others of the grate bars terminating inwardly short of the limits of the central opening and said plate having radial slots extending from inner ends of the latter grate bars to the central opening.

3. In a cooking range, a top panel, a hollow annular gas burner disposed below said panel, a grate supported on said top panel and including a substantially imperforate flat annular plate portion in partially overhanging spaced relation to the hollow burner, said plate having a central opening, the ports in the burner being so arranged that flame is directed therefrom centrally of the burner and the opening in the plate, said burner having downwardly inwardly sloping reflecting surfaces tending to concentrate the heat of the gas flame centrally of the grate.

4. In a cooking range, a top panel having a burner opening, a gas burner comprising an annular hollow burner head with ports arranged to direct flame inwardly toward the center of the head, an annular burner bowl supported by the top panel extending downwardly therefrom and continuously about the burner in spaced relation thereto, said burner bowl having a rim portion extending over the top panel around the opening therein, a grate comprising a plurality of radially extending grate bars, and means connecting the same, pins supported by the top panel extending through openings in the rim portion of the burner bowl, the grate having sockets receiving the upper ends of the pins to locate the grate.

5. In combination, a burner head having a circular, generally horizontal, row of ducts positioned about an upright axis and arranged to discharge fuel jets generally toward the axis, a plate having a central opening of substantially the same diameter as the row of ducts, means supporting the plate in spaced relation above the burner head with the opening and row of ducts coaxial, and means fixedly related to the plate and operative to support a utensil in spaced relation above the plate and in overlying relation to the central opening, and a burner bowl having a central opening of larger diameter than the row of ducts, and means supporting the bowl between the plate and burner head with its central opening coaxial with the row of ducts.

VINCENT J. EVANS.

REFERENCES CITED

The following references are of record in the file of this patent:

UNITED STATES PATENTS

| Number | Name | Date |
|---|---|---|
| D. 122,275 | Reeves | Sept. 3, 1940 |
| 1,179,716 | Griswold | Apr. 18, 1916 |
| 1,395,404 | Flick | Nov. 1, 1921 |
| 1,439,108 | Kennedy | Dec. 19, 1922 |
| 1,546,919 | Dore | July 21, 1925 |
| 1,582,738 | Dugger | Apr. 27, 1926 |
| 1,647,712 | O'Dowd | Nov. 1, 1927 |
| 1,663,438 | Brumbaugh | Mar. 20, 1928 |
| 1,959,657 | Chambers | May 22, 1934 |
| 1,991,503 | Hobson | Feb. 19, 1935 |
| 2,088,652 | Hobson | Aug. 3, 1937 |
| 2,092,744 | Hobson | Sept. 14, 1937 |
| 2,101,590 | Miller | Dec. 7, 1937 |
| 2,148,777 | Schneider et al. | Feb. 28, 1939 |
| 2,166,442 | Kahn | July 18, 1939 |
| 2,257,396 | Parker | Sept. 30, 1941 |
| 2,337,095 | Frick | Dec. 21, 1943 |
| 2,361,317 | Oatley | Oct. 24, 1944 |
| 2,403,142 | Turner | July 2, 1946 |

FOREIGN PATENTS

| Number | Country | Date |
|---|---|---|
| 24,570 | Great Britain | 1895 |
| 370,589 | Great Britain | Apr. 14, 1932 |
| 479,648 | Great Britain | Feb. 9, 1938 |
| 818,244 | France | Sept. 21, 1937 |